United States Patent [19]

Mohri et al.

[11] Patent Number: 6,159,441

[45] Date of Patent: *Dec. 12, 2000

[54] α-ALUMINA POWDER AND PROCESS FOR PRODUCING THE SAME

[75] Inventors: Masahide Mohri; Yoshio Uchida; Yoshinari Sawabe; Hisashi Watanabe, all of Ibaraki, Japan

[73] Assignee: Sumitomo Chemical Company, Limited, Osaka, Japan

[*] Notice: This patent is subject to a terminal disclaimer.

[21] Appl. No.: 09/286,255

[22] Filed: Apr. 6, 1999

Related U.S. Application Data

[63] Continuation of application No. 08/606,679, Feb. 26, 1996, Pat. No. 5,935,550, which is a continuation of application No. 08/227,028, Apr. 13, 1994, abandoned.

[30] Foreign Application Priority Data

| Apr. 13, 1993 | [JP] | Japan | 5-110971 |
| Apr. 13, 1993 | [JP] | Japan | 5-110972 |
| Jun. 30, 1993 | [JP] | Japan | 5-188912 |
| Jun. 30, 1993 | [JP] | Japan | 5-188914 |
| Jul. 8, 1993 | [JP] | Japan | 5-194277 |
| Nov. 19, 1993 | [JP] | Japan | 5-314131 |
| Dec. 1, 1993 | [JP] | Japan | 5-338758 |

[51] Int. Cl.⁷ ............................. C01F 7/02; C30B 1/00

[52] U.S. Cl. ................................. 423/625; 117/7

[58] Field of Search .................... 423/625; 117/4, 117/7, 950; 427/126.4

[56] References Cited

U.S. PATENT DOCUMENTS

| 3,175,883 | 3/1965 | Lindsay et al. | 423/625 |
| 3,384,454 | 5/1968 | Barrington | 423/625 |
| 4,019,914 | 4/1977 | Esper et al. | 423/625 |
| 4,130,402 | 12/1978 | Schepers et al. | 423/625 |
| 4,193,768 | 3/1980 | Ohishi et al. | 423/625 |
| 4,308,088 | 12/1981 | Cherdron et al. | 117/950 |
| 4,477,427 | 10/1984 | Matyasi et al. | 423/625 |
| 4,487,756 | 12/1984 | Mizrah et al. | 423/625 |
| 4,806,198 | 2/1989 | Jagota et al. | 117/4 |
| 4,822,592 | 4/1989 | Misra | 423/625 |
| 5,149,520 | 9/1992 | Sucech et al. | 423/625 |
| 5,340,781 | 8/1994 | Oda et al. | 423/625 |
| 5,538,709 | 7/1996 | Mohri et al. | 423/625 |
| 5,549,746 | 8/1996 | Scott et al. | 117/4 |
| 5,672,554 | 9/1997 | Mohri et al. | 501/127 |

FOREIGN PATENT DOCUMENTS

| 0224118 | 6/1987 | European Pat. Off. . |
| 0277730 | 8/1988 | European Pat. Off. . |
| 1159418 | 12/1963 | Germany . |
| 1767511 | 9/1971 | Germany . |
| 990801 | 5/1965 | United Kingdom . |
| 90-15777 | 12/1990 | WIPO . |
| 93-24681 | 12/1993 | WIPO . |
| 93-24682 | 12/1993 | WIPO . |

OTHER PUBLICATIONS

Proc. Light Metals 1990 (Warrandale, US) pp. 115–119.

Chemical Abstracts. vol. 104, No. 10, Mar. 1986, abstract No. 71187t 62th CATSJ Meeting Abstracts: No. 2D105 (with full English translation).

*Primary Examiner*—Steven Bos
*Attorney, Agent, or Firm*—Sughrue, Mion, Zinn, Macpeak & Seas, PLLC

[57] ABSTRACT

A process for producing α-alumina powder comprising the step of calcining at least one of transition alumina and a transition alumina precursor capable of becoming transition alumina on heating, in a gas atmosphere containing (1) a hydrogen halide, (2) a component prepared from a halogen and steam or (3) a halogen, in the presence of at least one of a seed crystal and a shape-controlling agent. The α-alumina powder is particularly useful as a raw material for abrasives, fillers, sinters or spacers which comprises α-alumina particles having a substantially octahedral or eicosahedral shape, a specific structure, and a narrow primary particle size distribution.

11 Claims, 15 Drawing Sheets

α-ALUMINA POWDER AND PROCESS FOR PRODUCING THE SAME

This is a Continuation of application Ser. No. 08/606,679 filed Feb. 26, 1996, now U.S. Pat. No. 5,935,550, which is a continuation application of application Ser. No. 08/227, 028 filed Apr. 13, 1994, abandoned, the disclosures of which are incorporated herein by reference.

FIELD OF THE INVENTION

This invention relates to α-alumina powder having excellent characteristics and a process for producing the same.

BACKGROUND OF THE INVENTION

α-alumina powder is widely used as raw materials for abrasives, sinters, plasma spraying materials, fillers, etc. α-Alumina powder obtained by conventional processes that have been generally employed comprises irregular-shaped polycrystals, contains many agglomerated particles, and has broad particle size distribution. The purity of such conventional α-alumina products is insufficient for some uses. In order to avoid these disadvantages and, for some specific uses, to control primary particle size or shape, α-alumina powder produced by special processes as hereinafter described has been employed. However, these special processes still involve difficulty in producing α-alumina powder with a narrow primary particle size distribution, which comprises α-alumina particles having a controlled shape, a controlled primary size, and homogeneity. Further, in order to orientate α-alumina particles in a specific direction when packed or laminated in layer(s), it is desirable that the powder comprises α-alumina particles having a rod-like shape, a cocoon shape or a thick plate shape. However, conventionally obtained α-alumina powder has broad primary particle size-distribution or the particles thereof have a thin plate shape, and it has hitherto been difficult to obtain α-alumina powder having a narrow primary particle size distribution and the particles thereof having such a shape suitable for orientation.

Among general processes for producing α-alumina powder a Bayer's process is the most economical process. In a Bayer's process, bauxite is once converted to aluminum hydroxide or transition alumina, which is then calcined in air to prepare α-alumina powder.

The aluminum hydroxide or transition alumina which is obtained as an intermediate product on an industrial scale at low cost comprises agglomerated particles having a diameter of greater than 10 $\mu$m. α-Alumina powder obtained by calcination of such aluminum hydroxide or transition alumina in air comprises primary particles of irregular shape containing many coarse particles agglomerated strongly. The α-alumina powder containing coarse agglomerated particles are ground into final products by means of a ball mill, a vibration mill, etc., but grinding is not always easy and incurs the cost. Further, α-alumina powder having poor grindability needs a long grinding time, consequently too fine powder may be formed.

Several proposals have been made to solve these problems. For example, JP-A-59-97528 (the term "JP-A" as used herein means an "unexamined published Japanese patent application") teaches a process for improving the shape of α-alumina powder, which comprises calcining aluminum hydroxide prepared by a Bayer process in the presence of an ammonium-containing boron or boron series mineralizer to obtain α-alumina powder having an average primary particle diameter of from 1 to 10 $\mu$m and a D/H ratio approximate to 1, wherein D is a maximum particle diameter parallel to a hexagonal lattice plane of a hexagonal close-packed lattice of α-alumina, and H represents a maximum particle diameter perpendicular to the hexagonal lattice plane. Since the starting aluminum hydroxide has a particle diameter of several tens of micrometers ($\mu$m) or greater, and the calcination is carried out in a rotary kiln, the resulting α-alumina powder has a broad primary particle size distribution and the particles thereof have irregular shapes. It is also difficult to arbitrarily control the primary particle size or shape.

Known special processes for producing α-alumina powder include a hydrothermal process utilizing a hydrothermal reaction of aluminum hydroxide; a flux process comprising adding a flux to aluminum hydroxide, fusing, and precipitating; and a process comprising calcination of aluminum hydroxide in the presence of a mineralizer.

With respect to a hydrothermal process, JP-B-57-22886 (the term "JP-B" as used herein means an "examined published Japanese patent application") discloses addition of corundum as a seed crystal to control the particle size. Because the synthesis in this process is carried out in a high temperature under a high pressure, it involves a problem in that the resulting α-alumina powder becomes expensive.

A flux process has been proposed as a means for controlling the particle shape or primary particle size of α-alumina powder for use as an abrasive, a filler, etc. For example, JP-B-3-131517 discloses a process comprising calcining aluminum hydroxide in the presence of a fluorine series flux having a melting point of not more than 800° C. to prepare α-alumina powder which comprises hexagonal plate-shaped α-alumina particles having an average primary particle size of from 2 to 20 $\mu$m and a D/H ratio of from 5 to 40, wherein D and H are as defined above. However, this process cannot provide fine α-alumina powder having a primary particle diameter of 2 $\mu$m or less, and all the particles obtained have a plate shape. In other words, the process was unable to arbitrarily control the shape and particle size.

*Journal of American Ceramic Society*, Vol. 68, No. 9, pp. 500–505 (1985) reports that the temperature of a transition can be reduced by addition of α-alumina to boehmite. However, since the purpose thereof is to obtain a sintered body of fine grain size, α-alumina powder with controlled primary particle size and shape cannot be obtained by this technique.

U.S. Pat. No. 4,657,754 discloses a process for obtaining α-alumina powder whose particles are smaller than 1 $\mu$m in diameter comprising adding α-alumina seed crystals to an α-alumina precursor, followed by calcination and grinding. The powder obtained by the above calcination comprises agglomerates of fine primary particles of not greater than 1 $\mu$m, and the primary particles greater than 10 $\mu$m cannot be obtained by the process.

Therefore, there has not yet been established a technique for producing α-alumina powder in which the primary particle diameter can arbitrarily be controlled from submicrons to several tens of microns; the particle shape can be controlled from a hexagonal plate shape to a column shape; or the particle size distribution can be narrowed while arbitrarily controlling the crystal habit of the a face $\{11\bar{2}0\}$, c face $\{0001\}$, n face $\{22\bar{4}3\}$ and r face $\{10\bar{1}2\}$. There has been a keen demand to develop such techniques.

Moreover, α-alumina powder whose particles have a sufficient thickness for easy orientation, has a narrow primary particle size distribution, and is particularly suitable as a raw material for abrasives, fillers, sinters or spacer has not yet been obtained.

SUMMARY OF THE INVENTION

An object of the present invention is to provide a process for producing α-alumina powder having a narrow primary particle size distribution, in which the particle size and shape of the primary particles can arbitrarily be controlled.

A further object of the present invention is to provide α-alumina powder comprising α-alumina particles having a substantially octahedral or eicosahedral shape, a specific structure, and a narrow primary particle size distribution. Such powder is the most useful as a raw material for abrasives, fillers or sinters.

These and other objects and effects of the present invention will be apparent from the following description.

The present inventors have found that the above objects of the present invention are accomplished by calcining a raw material, such as transition alumina, in a specific gas atmosphere in the presence of a seed crystal and/or a shape-controlling agent. The present invention has been completed based on this finding.

The present invention provides a process for producing α-alumina powder comprising the step of calcining at least one of transition alumina and a transition alumina precursor capable of becoming transition alumina on heating, in the presence of at least one of a seed crystal and a shape-controlling agent, in a gas atmosphere selected from (1) a gas atmosphere containing a hydrogen halide, (2) a gas atmosphere containing a component prepared from a halogen and steam, or (3) a gas atmosphere containing a halogen.

The present invention also relates to α-alumina powder which comprises α-alumina particles having a substantially octahedral or eicosahedral shape; a hexagonal close-packed lattice of a D/H ratio of from 0.5 to 30, wherein D represents a maximum particle diameter parallel to a hexagonal lattice plane of a hexagonal close-packed lattice of α-alumina, and H represents a maximum particle diameter perpendicular to the lattice plane; rotational symmetry of a symmetry number of 6 on the axis perpendicular to the lattice plane; and a primary size distribution of not more than 10 as expressed in terms of $D_{90}/D_{10}$, wherein $D_{10}$ and $D_{90}$ represent a cumulative 10% diameter and a cumulative 90% diameter, respectively, of a cumulative distribution depicted from the small diameter side.

DETAILED DESCRIPTION OF THE INVENTION

Figure 1:
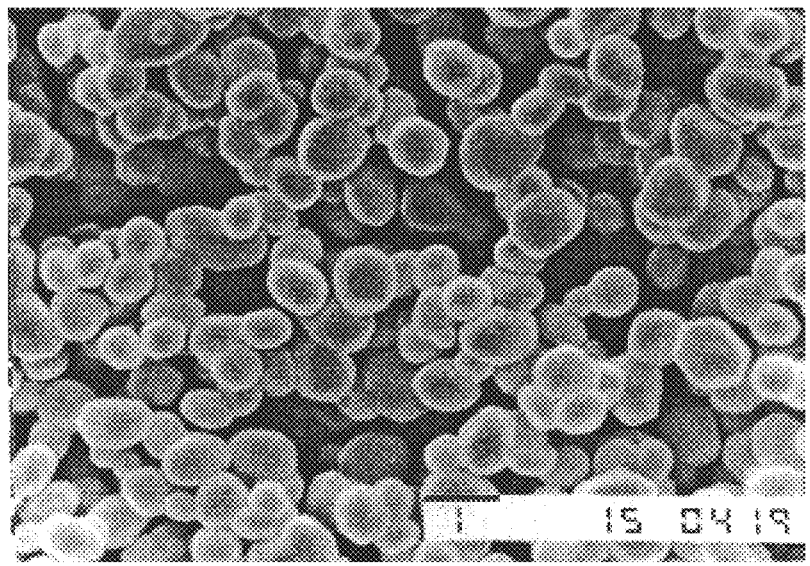
FIG. 1 is a scanning electron microscope (SEM) photograph (magnification: 9000) showing the particulate structure of the α-alumina powder obtained in Example 1.

The α-alumina powder according to the present invention can be prepared from transition alumina and/or a raw material capable of being converted to transition alumina on heating (hereinafter referred to as a transition alumina precursor). Transition alumina means all alumina species included under polymorphic alumina represented by $Al_2O_3$ except α-alumina. Specific examples of the transition alumina including γ-alumina, δ-alumina, and θ-alumina. The transition alumina precursor includes those that can be converted to α-alumina via transition alumina by calcination. Examples of the transition alumina precursor include aluminum hydroxide, aluminum sulfate, alum (e.g., potassium aluminum sulfate or ammonium aluminum sulfate), ammonium aluminum carbonate, and alumina gel (e.g., one obtained by electro-discharge in water).

The transition alumina and transition alumina precursors which can be used in the present invention are not particularly limited in synthesis. For example, aluminum hydroxide can be obtained by a Bayer process, hydrolysis of an organoaluminum compound, or a process starting with an aluminum compound recovered from an etching waste used for condensers, etc., and transition alumina can be obtained by a heat treatment of aluminum hydroxide, decomposition of aluminum sulfate, decomposition of alum, gaseous phase decomposition of aluminum chloride, or decomposition of ammonium aluminum carbonate.

According to the process of the present invention, desired α-alumina powder can be obtained even from aluminum hydroxide or transition alumina having a particle size of 10 μm or greater which is obtained by an industrially economical process, such as a Bayer process.

The seed crystal used in the present invention is a crystal serving as a nucleus for crystal growth of α-alumina. A crystal of α-alumina grows around the seed crystal. Any seed crystal may be used as far as this function is performed. Preferred seed crystals include compounds of aluminum, titanium, vanadium, chromium, iron or nickel and mixtures thereof. The compounds of these metals include oxides, nitrides, oxinitrides, carbides, carbide nitrides, and borides, with oxides and nitrides being preferred. Compounds of vanadium can serve both as the seed crystal and as a shape-controlling agent.

Proper selection of the kind and the amount of the seed crystal makes it possible to produce α-alumina powder comprising α-alumina particles having an arbitrary primary particle size and a specific polyhedral shape.

The amount of the seed crystal is usually from 10 ppm to 50 parts by weight, preferably from 100 ppm to 30 parts by weight, more preferably from 200 ppm to 10 parts by weight, per 100 parts by weight of transition alumina to be used or to be converted from its precursor.

The primary particle size of α-alumina obtained can be controlled by the number of the seed crystal to be added. The more the number of the seed crystal are added, the smaller the size of α-alumina can be obtained.

The shape-controlling agent used in the present invention is an agent that, through some unknown mechanism, acts in crystal growth to change the D/H ratio as hereinafter described and crystal habit. While not limiting, preferred shape-controlling agents include metals, such as magnesium, calcium, strontium, yttrium, zirconium, vanadium, niobium, molybdenum, copper, zinc, boron, silicon, lanthanum, cerium, and neodymium, compounds of these metals, and mixtures thereof. The compounds of the metals include oxides, nitrides, oxinitrides, carbides, carbide nitrides, halides, and borides, with oxides being preferred.

Proper selection of the shape-controlling agent makes it possible to produce α-alumina which comprises particles powder having primary particle size and shape controlled to suit to the end use.

The amount of the shape controlling agent is usually from 10 ppm to 50 parts by weight, preferably from 100 ppm to 30 parts by weight, more preferably 200 ppm to 10 parts by weight, per 100 parts by weight of transition alumina to be used or to be converted from its precursor. In the case of controlling D/H ratio of α-alumina particles, for example, α-alumina particles having greater D/H ratio can be obtained in proportion to increase of the amount of the agent for increasing D/H ratio. In the case of controlling crystal habit of α-alumina particles, for example, the area of N-plane in α-alumina particle becomes layer in proportion to increase of the amount of the agent for forming N-plane.

Both the seed crystal and the shape-controlling agent can be used in combination. In this case, α-alumina powder which comprises α-alumina particles having an arbitrary primary particle size, an arbitrary D/H ratio, arbitrary crystal habit, and an arbitrary shape can be obtained.

In the case that both the seed crystal and the shape controlling agent are used, the total amount of the seed crystal and the shape controlling agent is usually from 10 ppm to 50 parts by weight, preferably 100 ppm to 30 parts by weight, more preferably from 200 ppm to 10 parts by weight, per 100 parts by weight of transition alumina to be used or to be converted from its precursor.

The present invention is generally carried out by mixing the above-mentioned materials (i.e., a transition alumina and/or a precursor thereof, and a seed crystal and/or a shape controlling agent), and calcining the mixture. The method of mixing is not particularly restricted. Where a wet mixing method is followed, for example, either an aqueous solvent or an organic solvent may be used. Mixing can be conducted by means of a ball mill or a vertical granulator. Ultrasonication and stirring may also be employed. Worn substance of the materials in a mixing device, such as a mixing medium, may be used as a seed crystal or a shape-controlling agent. For example, α-alumina worn substance generated from α-alumina-made balls during the ball mill mixing may be used as a seed crystal.

The transition alumina and/or a precursor thereof mixed with the seed crystal and/or a shape-controlling agent is calcined in (1) a gas atmosphere containing a hydrogen halide preferably in a concentration of 0.1% by volume or more, more preferably 0.5% by volume or more, and most preferably 1.0% by volume or more. Component(s) other than hydrogen halide in the gas atmosphere, what is called, diluent gas include inert gases, e.g., nitrogen, hydrogen and argon, and air. The pressure of the gas atmosphere is not critical and may be selected arbitrarily from an industrially practical range. α-alumina powder having the excellent properties as desired can be obtained by calcination in a relatively low temperature as hereinafter described.

The gas atmosphere containing hydrogen halide (1) may be replaced with (2) a gas atmosphere containing a component prepared from a halogen and steam. In this case, transition alumina and/or a precursor thereof is calcined in an atmosphere containing the component prepared from a halogen preferably in a concentration of 0.1% by volume or more, more preferably 0.5% by volume or more, and most preferably 1.0% by volume or more, and steam preferably in a concentration of 0.01% by volume or more, more preferably 0.1% by volume or more, and most preferably 0.5% by volume or more. The component prepared from a halogen and steam can be obtained in a usual manner, for example, by introducing a halogen and steam into the system. A halogen and steam may previously be mixed and then introduced to the system. Component(s) other than the component prepared from the halogen and steam in the gas atmosphere, what is called, diluent gas include inert gases, e.g., nitrogen, hydrogen, and argon, and air. The pressure of the atmosphere is not particularly critical and may be selected arbitrarily from an industrially practical range. α-alumina powder having the excellent properties as desired can be obtained by calcination in a relatively low temperature as hereinafter described.

When the calcining is conducted in a gas atmosphere containing a hydrogen halide (1) or a gas atmosphere containing a component prepared from a halogen and steam, the calcining temperature is preferably from 500° to 1400° C., more preferably from 600° to 1300° C., and most preferably from 700° and 1200° C. By calcining at a temperature controlled within this range, α-alumina powder comprising α-alumina particles that are hardly agglomerated and, even immediately after calcination, show a narrow primary size distribution can be obtained at an industrially advantageous rate of formation. Where the starting material, i.e., transition alumina and/or a precursor thereof, has a large particle size, for example, where agglomerated particles having an average particle size exceeding 10 μm are used, a relatively high calcining temperature within the above-recited range, particularly 700° C. or higher is preferred.

The gas atmosphere containing hydrogen halide (1) may also be replaced by (3) a gas atmosphere containing a halogen. In this case, transition alumina and/or a precursor thereof is calcined in an atmosphere containing a halogen preferably in a concentration of at least 0.1% by volume, more preferably 0.5% by volume or more, and most preferably 1.0% by volume or more. Component(s) other than a halogen in the gas atmosphere, what is called, diluent gas include inert gases, e.g., nitrogen, hydrogen, and argon, and air. The pressure of the atmosphere is not critical and may be selected arbitrarily from an industrially practical range. α-alumina powder having the excellent properties as desired can be obtained.

Examples of the halogen which can be used in the present invention includes fluorine, chlorine, bromine, and iodine, with fluorine and chlorine being preferred, and chlorine being more preferred.

Where the gas atmosphere containing a halogen (3) is used, the calcining temperature is preferably from 950° to 1500° C., more preferably from 1050° to 1400° C., and most preferably from 1100° and 1300° C. By calcining at a temperature controlled within this range, α-alumina powder comprising α-alumina particles that are hardly agglomerated and, even immediately after calcination, show a narrow size distribution can be obtained at an industrially advantageous rate of formation. Where the starting material has a large particle size, for example, where agglomerated particles having an average particle size exceeding 10 μm are used, a relatively high calcining temperature within the above-recited range, particularly 1100° C. or higher is preferred.

Calcination of transition alumina and/or a precursor thereof should be continued for such a time sufficient for the starting materials to grow to α-alumina. While depending on the concentration of the gas atmosphere, the calcining temperature, and the like conditions, the calcination time is generally 1 minute or more, and preferably 10 minutes or more, but not limited thereto.

The source of gas and the method of supplying gas to the system are not particularly restricted, as long as the above-mentioned gas atmosphere is fed to the reaction system containing the starting materials. For example, a cylinder containing the gas is usually used as a supply source. Where an aqueous solution of a hydrogen halide, a halogen compound, e.g., an ammonium halide, or a halogen-containing high polymer is used, it can be fed at its vapor pressure or as decomposed so as to give a prescribed gas composition. The gas supply may be either in a continuous manner or in a batch system.

The calcining apparatus is not particularly limited, and a general calcining furnace can be employed. The calcining furnace is preferably made of a material resistant to corrosion by a hydrogen halide gas, a halogen gas, etc. The furnace is preferably equipped with a mechanism for controlling the atmosphere. Because an acidic gas, e.g., a hydrogen halide or a halogen gas, is used, the furnace is preferably air-tight. For industrial production, calcination is preferably carried out in a continuous manner by means of, for example, a tunnel kiln, a rotary kiln or a pusher oven.

Since the reaction proceeds in an acidic gas atmosphere, a crucible, a boat or a like tool used in the process is preferably made of alumina, quartz, acid resistant brick or graphite.

According to the process of the present invention, α-alumina powder can be obtained that comprises α-alumina particles having an octahedral or higher polyhedral shape as shown in FIG. 16, a hexagonal close-packed lattice having a D/H ratio of from 0.5 to 30, and homogeneity. The α-alumina particles show narrow primary particle size distribution and usually have an average primary particle diameter of from 0.1 to 30 μm and a D/H ratio of from 0.5 to 30.

In particular, the present invention provides α-alumina powder comprising α-alumina particles having a substantially octahedral or eicosahedral shape, a hexagonal close-packed lattice having a D/H ratio of from 0.5 to 30, rotational symmetry of a symmetry number of 6 on the axis perpendicular to the lattice plane, and a size distribution of not more than 10, preferably not more than 5, as expressed in terms of $D_{90}/D_{10}$, wherein $D_{10}$ and $D_{90}$ represent a cumulative 10% diameter and a cumulative 90% diameter, respectively, of a cumulative distribution depicted from the small diameter side. α-alumina powder having such a narrow primary particle size distribution is particularly suitable as a raw material of abrasives, fillers, spacers, and sinters.

The characteristics where an undistinguishable figure appears for every rotation by 2π/n (n is a positive integer) is designated rotational symmetry, n is designated a symmetry number, and the axis of rotation is designated n-fold axis of symmetry.

According to the process of the present invention, α-alumina powder which comprises α-alumina particles having homogeneity, narrow primary particle size distribution, and an octahedral or higher polyhedral shape, can be obtained from alumina raw materials of a variety of kinds, shapes, sizes, and compositions.

Proper selection of the kind and the amount of a seed crystal makes it possible to obtain α-alumina powder comprising α-alumina particles having an arbitrary primary particle size and a specific polyhedral shape. Since a D/H ratio and crystal habit can be varied by the use of a shape-controlling agent, proper selection of a shape-controlling agent makes it feasible to prepare α-alumina powder comprising α-alumina particles having any shape suited to the end use.

A combined use of a seed crystal and a shape-controlling agent makes it possible to produce α-alumina powder which comprises α-alumina particles primary particle having an arbitrary primary size, an arbitrary D/H ratio, arbitrary crystal habit, and an arbitrary shape suited to the end use.

The α-alumina powder obtained by the process of the present invention has excellent characteristics such as an average particle size of from 0.1 to 30 μm, a D/H ratio of the particle of from 0.5 to 30, and a narrow primary particle size distribution.

The α-alumina powder obtained by the process of the present invention has a narrow primary particle size distribution with its primary particle diameter controlled on the level of several micrometers (μm) and is therefore suitable as a raw material of encapsulant. In addition to the above-mentioned characteristics, the α-alumina powder has a high bulk density and can therefore attain a high packing density as a raw material for single crystals. Further, since the primary particle size of the α-alumina powder can be controlled arbitrarily, the powder can be used as a raw material for ceramic filters having various pore sizes. Furthermore, the particles of the α-alumina powder can have the edge shape varied by controlling the crystal habit so as to have a controlled abrasion effect.

The α-alumina powder obtained by the process of the present invention is suitable as a raw material for abrasives, sinters, plasma spraying materials, fillers, single crystals, supports for catalysts, fluorescent a substances, encapsulant, and ceramic filters. In particular, the α-alumina powder substantially made up of octahedral or eicosahedral shape is the most suitable as a raw material for abrasives, fillers, sinters or spacers and is extremely useful in industry.

The present invention will now be illustrated in greater detail with reference to Examples, but it should be understood that the present invention is not construed as being limited thereto.

Measurements in Examples and Comparative Examples were made as follows:

(1) Primary Particle Diameter and Primary Particle Size Distribution of α-alumina:

A micrograph of α-alumina powder was taken with a scanning electron microscope (SEM) ("T-300" manufactured by JEOL Ltd., hereinafter the same), and 80 to 100 particles selected were subjected to image analysis to obtain an average and the distribution of the circle-equivalent diameters. The term "circle-equivalent diameter" as used herein means a diameter of a true circle having the same area as that of a particle.

(2) Crystal Shape of α-alumina (D/H Ratio):

The shape of α-alumina particles was expressed in terms of a D/H ratio, wherein D and H are as defined above. Five to 10 particles were selected from the above-mentioned SEM photograph and subjected to image analysis to obtain an average of the D/H ratios.

(3) Crystal Habit:

The crystal habit of α-alumina particles was observed for evaluating the shape. The crystal habit of the polyhedral α-alumina particles obtained in the present invention (indicated by A to I) is shown in FIG. 16. α-alumina has a hexagonal system, and the term "crystal habit" used for α-alumina means the form of its crystal characterized by the way of appearance of the crystal faces composed of a face $\{11\bar{2}0\}$, c face $\{0001\}$, n face $\{22\bar{4}3\}$, and r face $\{10\bar{1}2\}$. In FIG. 16 are shown crystal faces a, c, n, and r.

(4) Number of Crystal Faces:

Determined by image analysis of the SEM photograph.

(5) Rotational Symmetry:

Determined by observation on the SEM photograph.

(6) $D_{90}/D_{10}$:

Determined with a Master Sizer (manufactured by Malbern Co.) which follows the principle of laser scattering.

(7) Compressive Strength

Compressive strength of particle was measured with dynamic ultra-micro hardness tester (DVH-200, manufactured by SHIMADZU CORPORATION).

(8) Observation of Internal Micro Structure with TEM

Internal micro structure of α-alumina particle was observed with Ultra High Voltage Transmitted Electron Microscope (TEM) (acceleration voltage 1200 KVA, manufactured by HITACHI, LTD.).

(9) Tapped Density

Tapped density of α-alumina powder was measured according to JIS-H-1902.

Raw materials to be calcined, seed crystals, and shape-controlling agents used in Examples and Comparative Examples are shown below.

Raw Materials

1. Transition alumina A:

Transition alumina obtained by calcination of aluminum hydroxide prepared by hydrolysis of aluminum isopropoxide ("AKP-G15" produced by Sumitomo Chemical Co., Ltd.; particle diameter: about 4 μm) (abbreviated as tr-al A in Tables).

2. Transition alumina B:

Transition alumina obtained by decomposition of alum ("CR 125" produced by Baikowski Chimie; particle diameter: about 4 μm) (abbreviated as tr-al B in Tables).

3. Aluminum hydroxide A:

Powder prepared by hydrolysis of aluminum isopropoxide (secondary particle diameter: about 8 μm) (abbreviated as al-hr A in Tables).

4. Aluminum hydroxide B:

Powder prepared by a Bayer process ("C 301" produced by Sumitomo Chemical Co., Ltd.; secondary particle diameter: about 4 μm) (abbreviated as al-hy B in Tables).

5. Aluminum hydroxide C:

Powder prepared by a Bayer process ("C 12" produced by Sumitomo Chemical Co., Ltd.; secondary particle diameter: about 30 μm) (abbreviated as al-hy C in Tables).

6. Alum ($AlNH_4(SO_4).12H_2O$):

Transition alumina precursor which gives transition alumina on heating. The reagent of Wako Pure Chemical Industries, Ltd. was used.

7. Aluminum sulfate ($Al_2(SO_4)_3.16H_2O$):

Transition alumina precursor which becomes transition alumina on heating. A product of Sumitomo Chemical Co., Ltd. was used.

Seed Crystals

1. α-alumina A:

"AKP-50", α-alumina powder produced by Sumitomo Chemical Co., Ltd.; average primary particle diameter: about 0.3 μm; abbreviated as α-al A in Tables.

2. α-alumina B:

"AKP-15", α-alumina powder produced by Sumitomo Chemical Co., Ltd.; average primary particle diameter: about 0.8 μm; abbreviated as α-al B in Tables.

3. α-alumina C:

α-alumina particles generated from alumina balls during ball milling (abbreviated as α-al C in Tables).

4. α-alumina D

α-alumina obtained by a method of the present invention; average primary particle diameter: about 3 μm.

5. Titanium oxide ($TiO_2$):

A reagent produced by Fuji Titanium Industry Co., Ltd.

6. Chromium oxide ($Cr_2O_3$):

A reagent produced by Wako Pure Chemical Industries, Ltd.

7. Iron oxide ($Fe_2O_3$):

A reagent produced by Bayer Japan Ltd.

8. Nickel oxide ($Ni_2O_3$):

A reagent produced by Nakarai Kagaku Yakuhin K.K.

9. Vanadium oxide ($V_2O_5$):

A reagent produced by Nakarai Kagaku Yakuhin K.K.

10. Aluminum nitride (AlN):

A reagent produced by Tokuyama Soda Co., Ltd.

Shape-Controlling Agent

1. Magnesium oxide (MgO):

A reagent produced by Wako Pure Chemical Industries, Ltd.

2. Boron oxide ($B_2O_3$):

A reagent produced by Wako Pure Chemical Industries, Ltd.

3. Magnesium hydroxide ($Mg(OH)_2$):

A reagent produced by Wako Pure Chemical Industries, Ltd.

4. Silicon oxide ($SiO_2$):

A reagent produced by Nippon Aerosil Co., Ltd.

5. Zirconium oxide ($ZrO_2$):

Zirconia gel obtained by hydrolysis of zirconium oxychloride ($ZrOCl_2$) produced by Nakarai Kagaku Yakuhin K.K.

6. Copper oxide (CuO):

A reagent produced by Nakarai Kagaku Yakuhin K.K.

7. Strontium oxide (SrO):

A reagent produced by Nakarai Kagaku Yakuhin R.K.

8. Zinc oxide (ZnO):
   A reagent produced by Nakarai Kagaku Yakuhin K.K.
9. Molybdenum oxide ($MoO_3$):
   A reagent produced by Nakarai Kagaku Yakuhin K.K.
10. Niobium oxide ($Nb_2O_5$):
    A reagent produced by Nakarai Kagaku Yakuhin K.K.
11. Calcium oxide (CaO):
    A reagent produced by Wako Pure Chemical Industries, Ltd.
12. Boron oxide ($B_2O_3$):
    A reagent produced by Wako Pure Chemical Industries, Ltd.
13. Yttrium oxide ($Y_2O_3$):
    A reagent produced by Nippon Yttrium K.K.
14. Lanthanum oxide ($La_2O_2$):
    A reagent produced by Nakarai Kagaku Yakuhin K.K.
15. Cerium oxide ($CeO_2$):
    A reagent produced by Santoku Kinzoku Kogyo K.K.
16. Neodymium oxide ($Nd_2O_3$):
    A reagent produced by Nippon Yttrium K.K.

Mixing of materials was performed by ultrasonication using isopropyl alcohol as a solvent except for milling using an alumina ball. Drying after mixing was carried out by means of a rotary evaporator and a drier.

Hydrogen chloride packed in a cylinder produced by Tsurumi Soda K.K. (purity: 99.9%) was used as a hydrogen chloride gas source, and chlorine packed in a cylinder produced by Fujimoto Sangyo K.K. (purity: 99.4%) was used as a chlorine gas source.

A decomposition gas of ammonium fluoride was used as a hydrogen fluoride gas source. Ammonium fluoride was heated to its subliming temperature, 220° C., and the resulting decomposition gas was introduced into the tube of a tubular furnace. Ammonium fluoride completely decomposed when kept at 1100° C. to provide an atmosphere comprising 33% by volume of hydrogen fluoride, 17% by volume of hydrogen, and 50% by volume of nitrogen.

A decomposition gas of ammonium bromide was used as a hydrogen bromide gas source. Ammonium bromide was heated to its subliming temperature, 420° C., and the resulting decomposition gas was introduced into the tube of a tubular furnace. Ammonium bromide completely decomposed when kept at 1100° C. to provide an atmosphere comprising 33% by volume of hydrogen bromide, 17% by volume of hydrogen, and 50% by volume of nitrogen.

A decomposition gas of ammonium iodide was used as a hydrogen iodide gas source. Ammonium iodide was heated to its subliming temperature, 380° C., and the resulting decomposition gas was introduced into the tube of a tubular furnace. Ammonium iodide completely decomposed when kept at 1100° C. to provide an atmosphere comprising 33% by volume of hydrogen iodide, 17% by volume of hydrogen, and 50% by volume of nitrogen.

A prescribed amount of a seed crystal and/or a shape-controlling agent was/were added to a starting material (transition alumina and/or a precursor thereof), and 0.4 g aliquot of the mixture was put in an alumina boat to a height of 5 mm. Calcination was carried out in a tubular furnace ("DSPSH-28" produced by Motoyama K.K.) using a quartz-made core tube (diameter: 27 mm; length: 1000 mm). The temperature was raised at a rate of 500° C./hr while feeding nitrogen gas, and a gas having a prescribed composition was introduced into the tubular furnace when the temperature reached to a prescribed temperature.

The steam partial pressure was controlled by adjusting the saturated vapor pressure of water dependent on temperature, and the steam was introduced into a furnace with a nitrogen carrier gas.

The gas concentration was controlled by adjustment of the gas flow rate by means of a flowmeter. The linear flow rate was set at 20 mm/sec (gas flow system). In Example 9 in which the hydrogen chloride concentration was low, the gas flow system was replaced with a system in which a prescribed gas atmosphere was introduced, and the gas feed was stopped to conduct calcination. In all Examples and Comparative Examples, calcination was conducted under atmospheric pressure.

On reaching a prescribed temperature, the furnace was maintained at that temperature (hereinafter referred to as a calcining temperature) for a prescribed time (hereinafter referred to as a calcination time). After a lapse of a prescribed calcination time, the furnace was allowed to cool to obtain α-alumina powder.

"Part(s) by weight" in Examples are based on 100 parts by weight of transition alumina to be used or to be converted from its precursor.

EXAMPLE 1

Transition aluminum A was mixed with 3 parts by weight of γ-alumina A as a seed crystal. Hydrogen fluoride gas obtained by decomposition of ammonium fluoride was fed at 800° C., and the mixture was calcined at 1100° C. for 30 minutes.

The calcining conditions and the results are shown in Tables 1 and 2. The SEM photograph of the α-alumina powder obtained is shown in FIG. 1.

EXAMPLE 2

Figure 2:
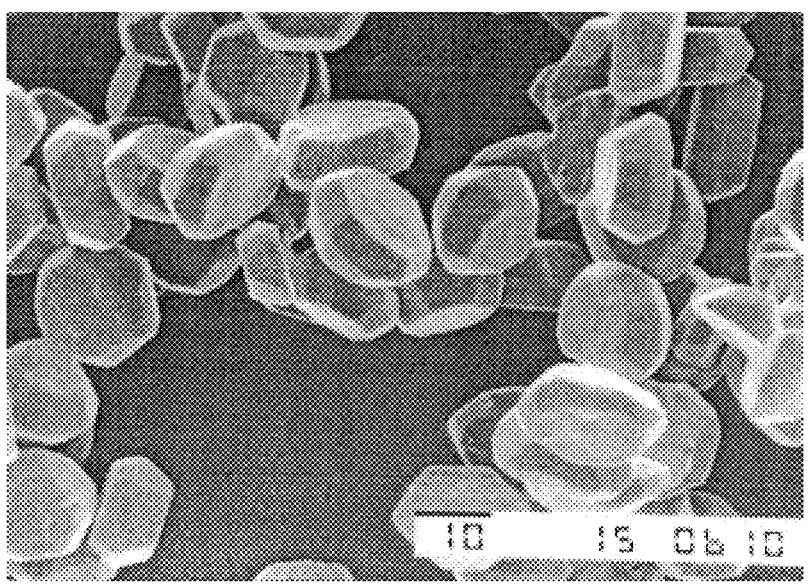
FIG. 2 is an SEM photograph (magnification: 900) showing the particulate structure of the α-alumina powder obtained in Example 2.

Calcination of transition aluminum A was carried out under the same conditions as in Example 1, except for replacing α-alumina A as a seed crystal with 1 part by weight, based on the alumina obtained from transition alumina A, of zirconia gel ($ZrO_2$) as a shape-controlling agent. The calcination conditions and the results obtained are shown in Tables 1 and 2. The SEM photograph of the α-alumina powder obtained is shown in FIG. 2.

EXAMPLE 3

Calcination is carried out in the same manner as in Example 1, except for replacing transition alumina A (γ-alumina) with aluminum hydroxide A as a raw material. The same α-alumina powder as obtained in Example 1 is obtained. The calcination conditions are shown in Tables 1 and 2.

EXAMPLE 4

Calcination of transition alumina A is carried out in the same manner as in Example 1, except for replacing hydrogen fluoride with fluorine and steam. The α-alumina powder obtained is equal to that obtained in Example 1. The calcination conditions are shown in Tables 1 and 2.

EXAMPLES 5 TO 9

Aluminum hydroxide A to which 0.1 part by weight, based on the alumina obtained from aluminum hydroxide A, of α-alumina A had been added was calcined in an atmosphere having a varied hydrogen chloride gas concentration at 1100° C. The calcination time was varied in accordance with the hydrogen chloride concentration. Hydrogen chloride gas was fed at 800° C. The calcination conditions and the results obtained are shown in Tables 1 and 2.

Internal structure of α-alumina particle obtained in Example 6 was observed with TEM. No defect in the particle was detected.

EXAMPLES 10 AND 11

Aluminum hydroxide A was calcined in the same manner as in Example 6, except for changing the temperature at which hydrogen chloride gas was introduced and the calcining temperature and time as shown in Table 1. The results obtained are shown in Table 2.

EXAMPLE 12

Aluminum hydroxide A was calcined in the same manner as in Example 6, except for changing the temperature at which hydrogen chloride gas was introduced as shown in Table 1. The results obtained are shown in Table 2.

EXAMPLES 13 TO 18

Calcination was carried out in the same manner as in Example 6, except for replacing aluminum hydroxide A with the raw material shown in Table 1. The results obtained are shown in Table 2.

EXAMPLES 19 TO 30

Aluminum hydroxide A was calcined in the same manner as in Example 6, except for changing the kind and the amount of the seed crystal as shown in Tables 1 and 3. The results obtained are shown in Table 2 and 4.

The α-alumina powder obtained in the system using vanadium oxide as a seed crystal (Example 29) had a unique crystal shape as represented by a D/H ratio of 2.0, which is markedly higher as compared with the other systems.

Compressive strength of each of α-alumina particle obtained in Example 22 and 26 was measured.

Internal structure of α-alumina obtained in Example 25 was observed with TEM. No defect in the particle was detected.

Figure 3:
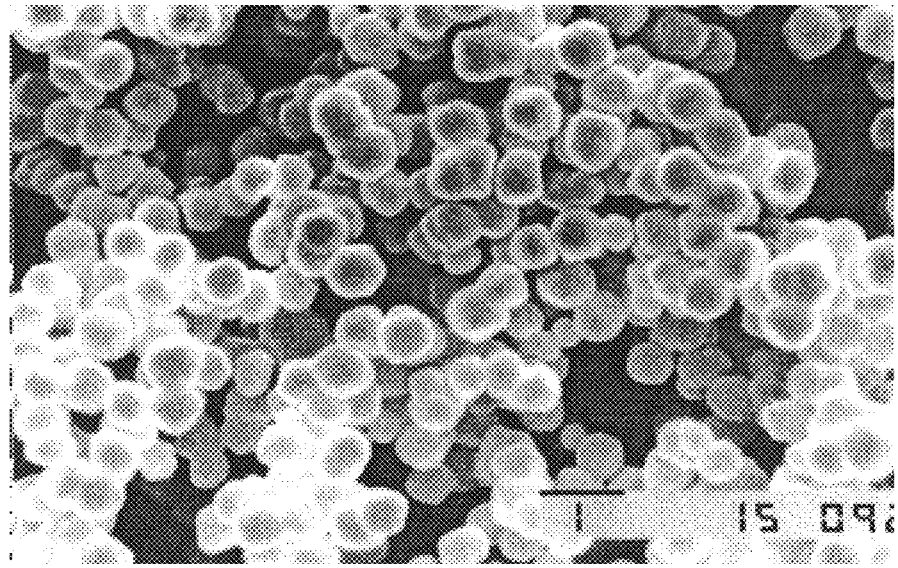
FIG. 3 is an SEM photograph (magnification: 10000) showing the particulate structure of the α-alumina powder obtained in Example 19.
Figure 4:
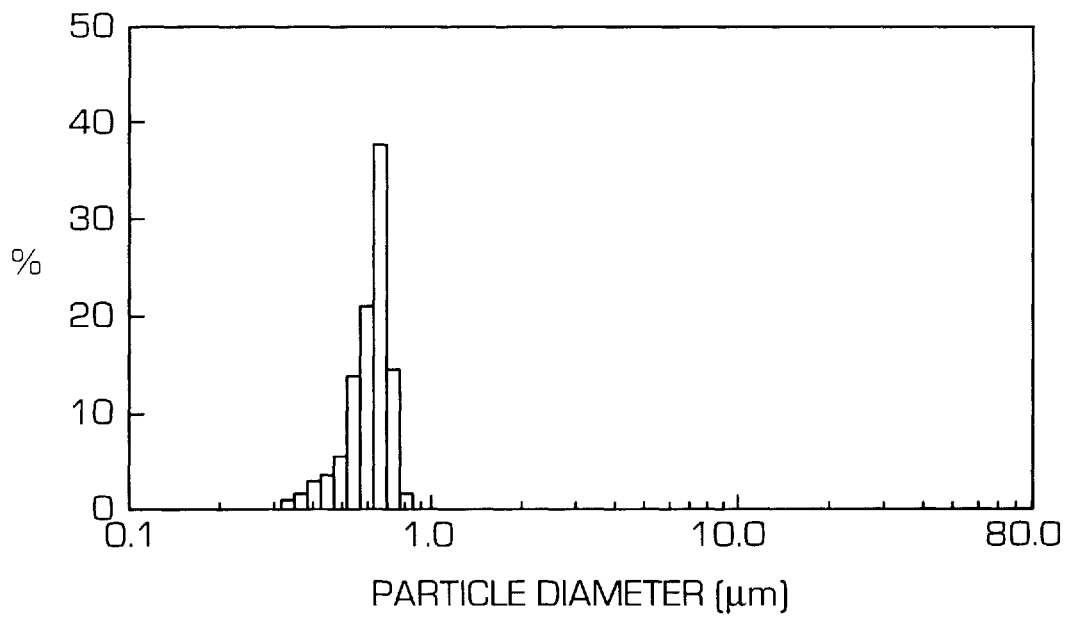
FIG. 4 shows primary particle size distribution of the α-alumina powder obtained in Example 19.
Figure 6:
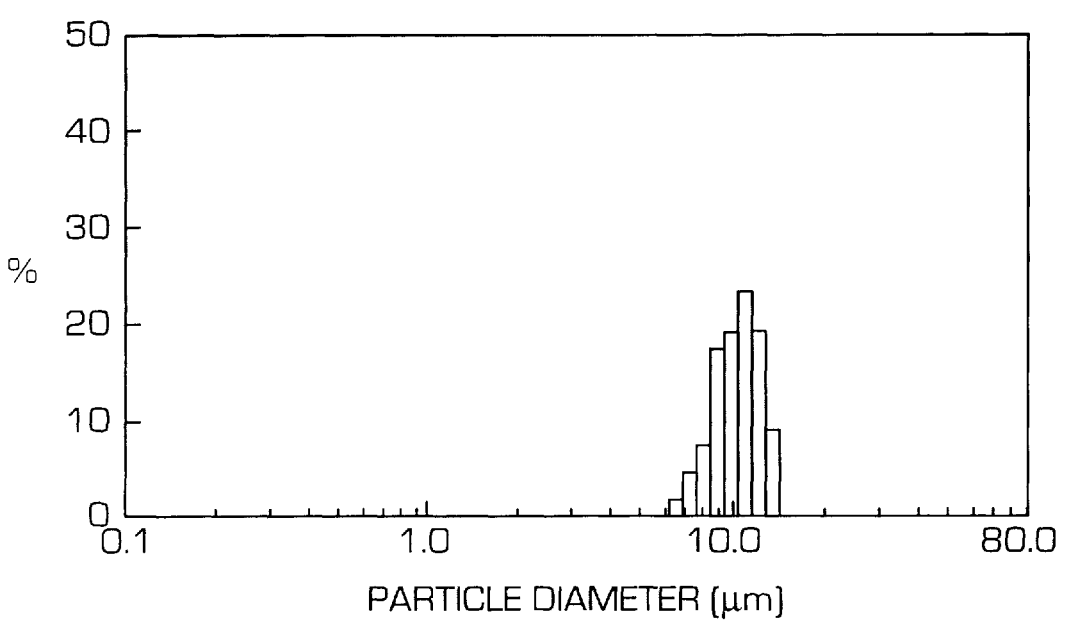
FIG. 6 shows primary particle size distribution of the α-alumina powder obtained in Example 35.
Figure 5:
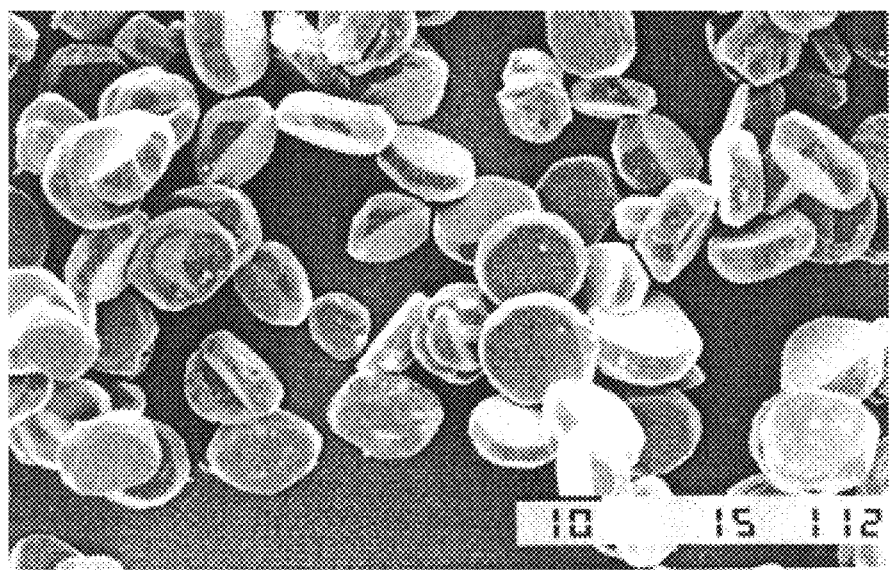
FIG. 5 is an SEM photograph (magnification: 1000) showing the particulate structure of the α-alumina powder obtained in Example 35.

The SEM photograph of the α-alumina powder obtained in Example 19 is shown in FIG. 3, and the particle size distribution of this powder is shown in FIG. 4.

EXAMPLE 31

Aluminum hydroxide A was calcined in the same manner as in Example 6, except that chlorine gas and steam were introduced into the tubular kiln as a gas atmosphere. The calcination conditions and the results obtained are shown in Tables 3 and 4.

EXAMPLES 32 AND 33

Aluminum hydroxide A was calcined in the same manner as in Example 6, except for using a shape-controlling agent shown in Table 3 in addition to the seed crystal. The calcination conditions and the results obtained are shown in Tables 3 and 4.

EXAMPLES 34 TO 49

Aluminum hydroxide A was calcined in the presence of various metal oxides as a shape-controlling agent. The calcination conditions and the results obtained are shown in Tables 3, 4, 5 and 6.

EXAMPLES 50 AND 51

Aluminum hydroxide A was calcined in the same manner as in Example 38 or 35, except for changing the temperature at which the gas atmosphere was introduced. The calcination conditions and the results obtained are shown in Tables 5 and 6.

EXAMPLE 52

Calcination was carried out in the same manner as in Example 45, except for replacing aluminum hydroxide A with transition alumina A. The calcination conditions and the results obtained are shown in Tables 5 and 6.

EXAMPLE 53

Aluminum hydroxide A is calcined in the same manner as in Example 35, except for using chlorine gas and steam as a gas atmosphere. As a result, the same α-alumina powder as obtained in Example 35 is obtained. The calcination conditions are shown in Tables 5 and 6.

EXAMPLE 54

Calcination is carried out in the same manner as in Example 35, except for using alum as a starting material. The resulting α-alumina powder is substantially equal to that obtained in Example 35. The calcination conditions are shown in Tables 5 and 6.

EXAMPLE 55

Figure 7:
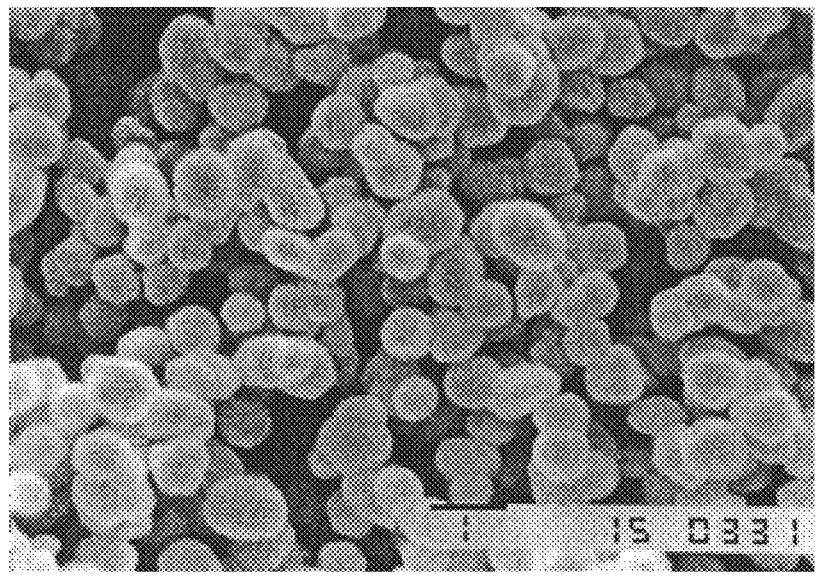
FIG. 7 is an SEM photograph (magnification: 9000) showing the particulate structure of the α-alumina powder obtained in Example 55.

Transition alumina A to which α-alumina A had been added as a seed crystal was calcined in an atmosphere containing hydrogen bromide obtained by decomposition of ammonium bromide. The SEM photograph of the resulting α-alumina powder is shown in FIG. 7. The calcination conditions and the results obtained are shown in Tables 5 and 6.

EXAMPLE 56

Figure 8:
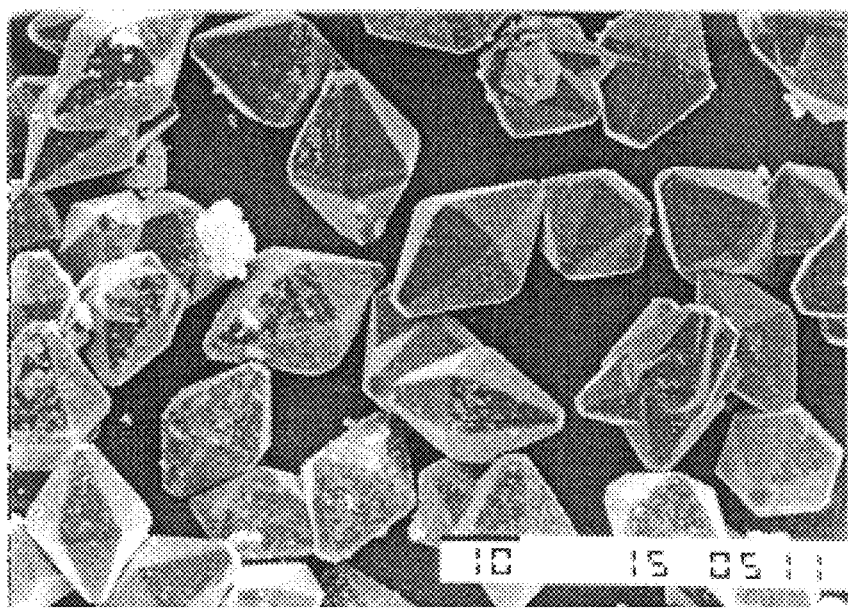
FIG. 8 is an SEM photograph (magnification: 900) showing the particulate structure of the α-alumina powder obtained in Example 56.

Calcination was carried out in the same manner as in Example 54, except for replacing alum as a raw material with transition alumina A and replacing MgO as a shape-controlling agent with zirconia gel ($ZrO_2$). The SEM photograph of the resulting α-alumina powder is shown in FIG. 8. The calcination conditions and the results obtained are shown in Tables 5 and 6.

EXAMPLE 57

Calcination is carried out in the same manner as in Example 55, except for replacing transition alumina A as a raw material with aluminum hydroxide A. The resulting α-alumina powder is equal to that obtained in Example 55. The calcination conditions are shown in Tables 5 and 6.

EXAMPLE 58

Transition aluminum A is calcined in the same manner as in Example 55, except for using bromine gas and steam as a gas atmosphere. The resulting α-alumina powder is equal to that obtained in Example 55. The calcination conditions are shown in Tables 5 and 6.

EXAMPLE 59

Figure 9:
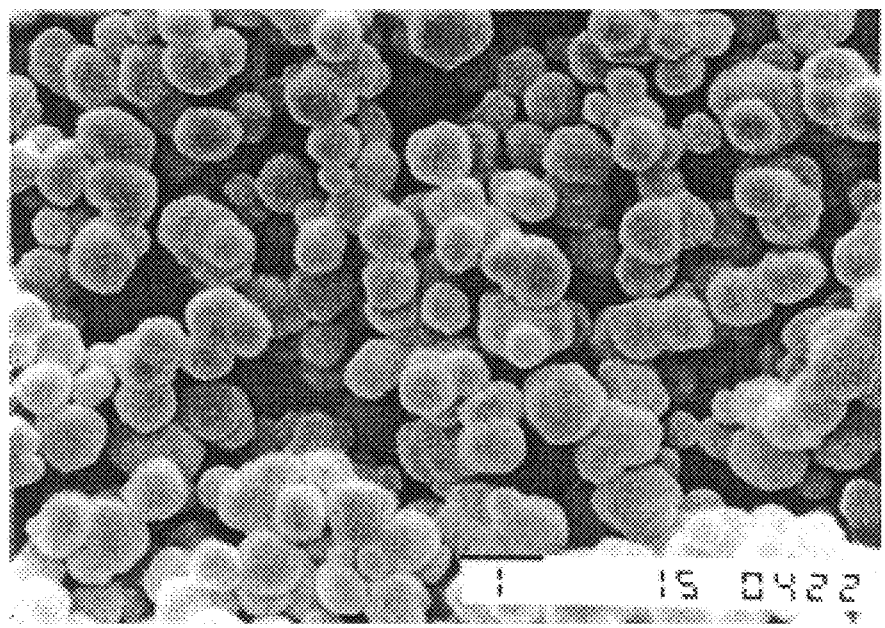
FIG. 9 is an SEM photograph (magnification: 9000) showing the particulate structure of the α-alumina powder obtained in Example 59.

Transition alumina A to which α-alumina A had been added as a seed crystal was calcined in a gas atmosphere containing hydrogen iodide obtained by decomposition of ammonium iodide. The SEM photograph of the resulting α-alumina powder is shown in FIG. 9. The calcination conditions and the results obtained are shown in Tables 5 and 6.

EXAMPLE 60

Figure 10:
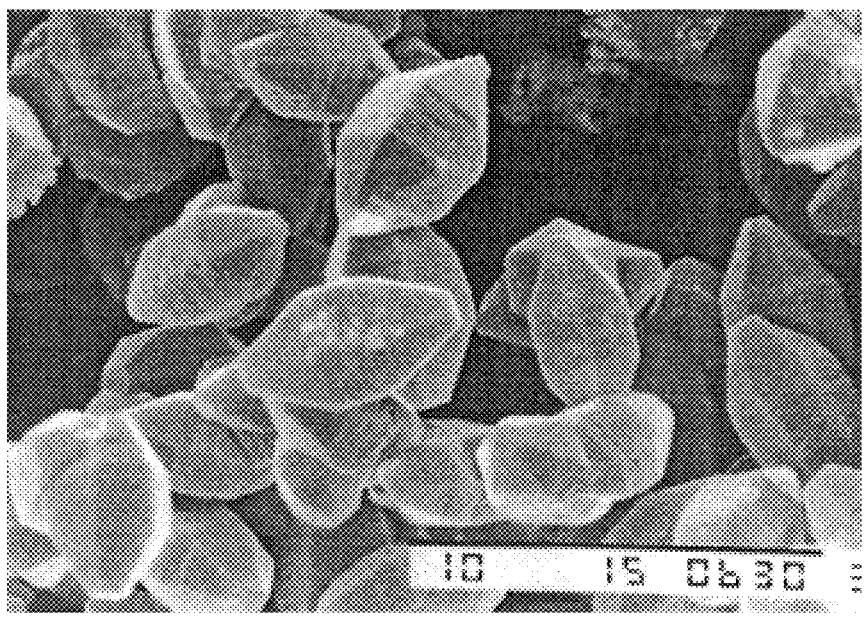
FIG. 10 is an SEM photograph (magnification: 4300) showing the particulate structure of the α-alumina powder obtained in Example 60.

Transition alumina A was calcined in the same manner as in Example 1, except for replacing α-alumina A as a seed crystal with α-alumina B and further adding zirconia gel (ZrO$_2$) as a shape-controlling agent. The SEM photograph of the resulting α-alumina powder is shown in FIG. 10. The calcination conditions and the results obtained are shown in Tables 5 and 6.

EXAMPLE 61

Calcination is carried out in the same manner as in Example 59, except for replacing transition aluminum A with aluminum hydroxide A as a starting material. The resulting α-alumina powder is equal to that obtained in Example 59. The calcination conditions are shown in Table 5 and 6.

EXAMPLE 62

Transition aluminum A is calcined in the same manner as in Example 59, except for using a gas atmosphere containing iodine gas and steam. The resulting α-alumina powder is equal to that obtained in Example 59. The calcination conditions are shown in Table 5 and 6.

EXAMPLE 63

Figure 11:
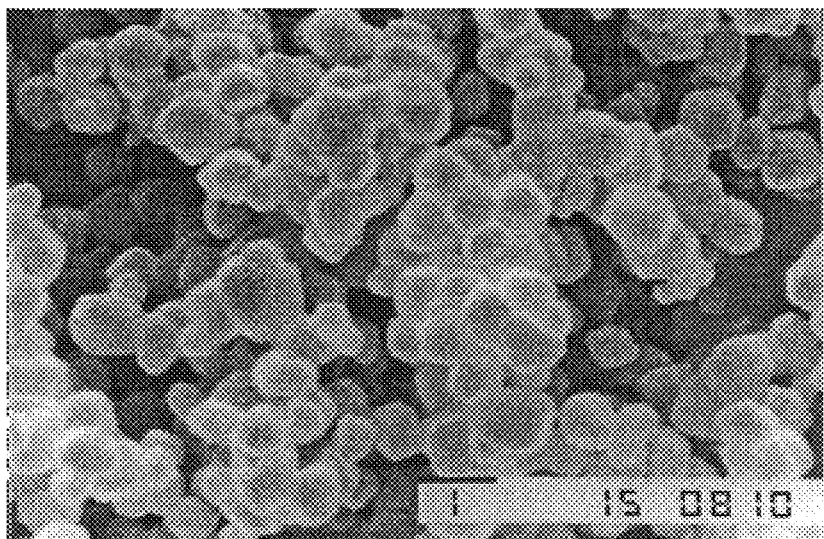
FIG. 11 is an SEM photograph (magnification: 9000) showing the particulate structure of the α-alumina powder obtained in Example 63.

Transition alumina A to which α-alumina A had been added as a seed crystal was calcined in a chlorine gas atmosphere under conditions shown in Tables 5 and 6. The SEM photograph of the resulting α-alumina powder is shown in FIG. 11. The results obtained are shown in Table 6.

EXAMPLE 64

Transition alumina A was calcined in the same manner as in Example 63, except for changing the composition of the gas atmosphere and the calcining temperature. The resulting α-alumina powder was equal to that obtained in Example 63. The calcination conditions and the results obtained are shown in Tables 5 and 6.

EXAMPLE 65

Transition alumina A was calcined in the same manner as in Example 63, except for replacing α-alumina A as a seed crystal with calcium oxide as a shape-controlling agent. As a result, (x-alumina powder having a D/H ratio of 3 was obtained. The calcination conditions and the results obtained are shown in Tables 5 and 6.

EXAMPLE 66

Figure 12:
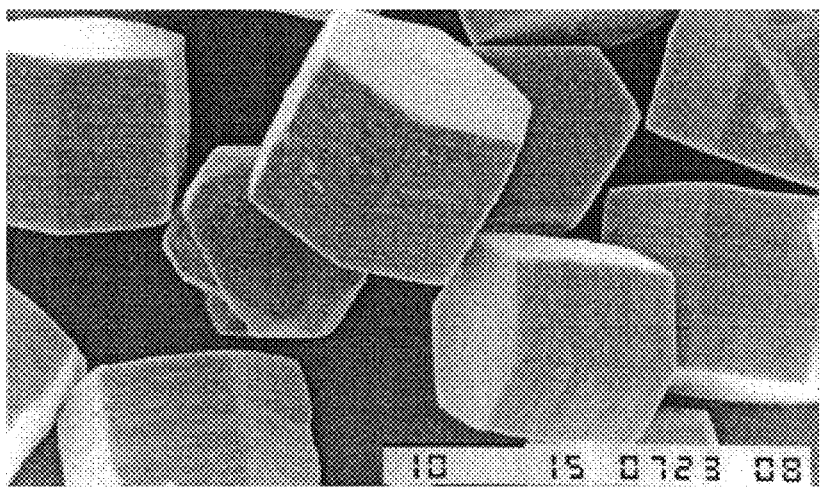
FIG. 12 is an SEM photograph (magnification: 1710) showing the particulate structure of the α-alumina powder obtained in Example 66.

Aluminum hydroxide A were mixed with 0.1 part by weight of boron oxide (B$_2$O$_3$) as a shape-controlling agent by ultrasonication in isopropyl alcohol, and the mixture was calcined in a gas atmosphere consisting of 30% by volume of hydrogen chloride and 70% by volume of nitrogen at 1100° C. for 30 minutes. The resulting α-alumina powder had an octahedral shape and a D$_{90}$/D$_{10}$ ratio of 2.0. The SEM photograph of the powder is shown in FIG. 12. The calcination conditions and the results obtained are shown in Tables 5 and 6.

EXAMPLE 67

Figure 13:
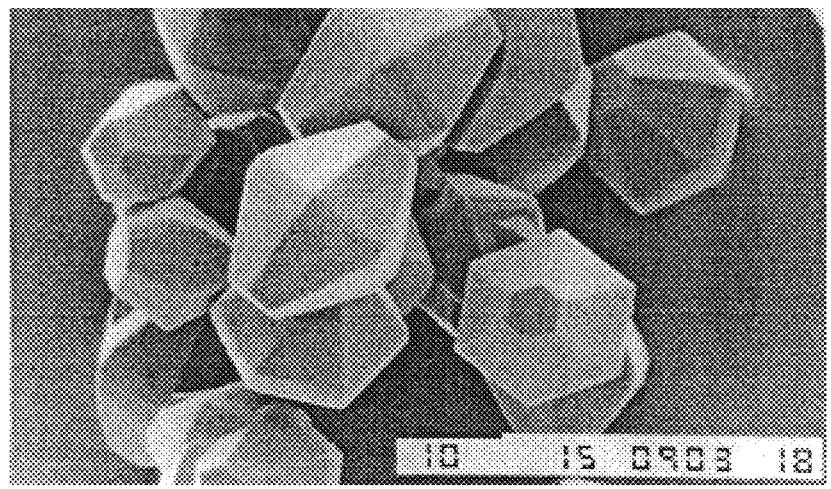
FIG. 13 is an SEM photograph (magnification: 1280) showing the particulate structure of the α-alumina powder obtained in Example 67.

Aluminum hydroxide A to which 1 part by weight of zirconia gel (ZrO$_2$) as a shape-controlling agent had been added was calcined in the same manner as in Example 66. The resulting α-alumina powder had an eicosahedral shape and a D$_{90}$/D$_{10}$ ratio of 2.0. The SEM photograph of the powder is shown in FIG. 13. The calcination conditions and the results obtained are shown in Tables 5 and 6.

COMPARATIVE EXAMPLE 1

Figure 14:
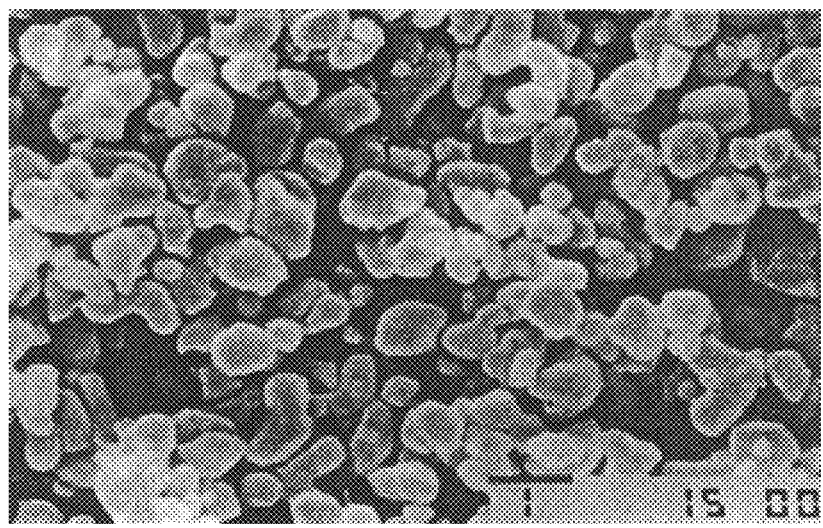
FIG. 14 is an SEM photograph (magnification: 10000) showing the particulate structure of the α-alumina powder obtained in Comparative Example 1.
Figure 15:
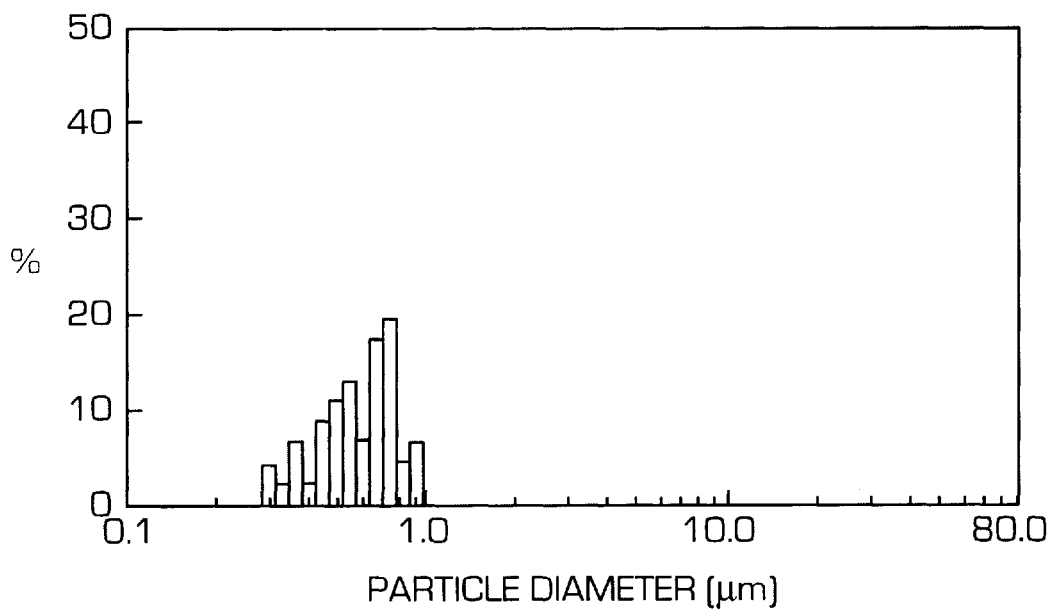
FIG. 15 shows primary particle size distribution of the α-alumina powder obtained in Comparative Example 1.
Figure 16A:
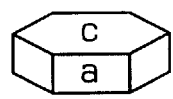
FIG. 16 shows the crystal habit of α-alumina particles.
Figure 16D:
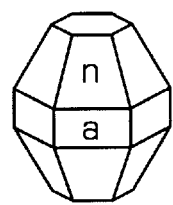
Figure 16G:
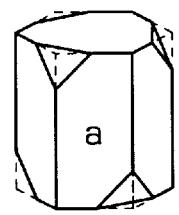
Figure 16B:
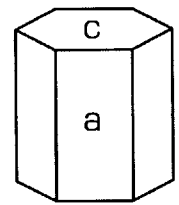
Figure 16E:
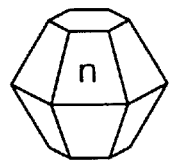
Figure 16H:
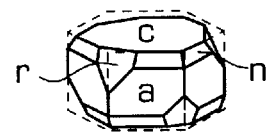
Figure 16C:
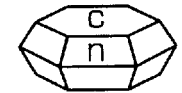
Figure 16F:
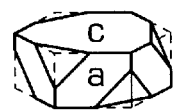
Figure 16I:
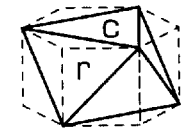

Aluminum hydroxide A was calcined under conventional conditions, i.e., at 1300° to 1400° C. for 1 to 4 hours in air. The resulting α-alumina powder had a D$_{90}$/D$_{10}$ ratio of 4.0, an average particle diameter of about 0.7 μm, and an irregular shape. The SEM photograph of the powder is shown in FIG. 14, and the particle size distribution of the powder is shown in FIG. 15. The calcination conditions and the results obtained are shown in Tables 7 and 8.

COMPARATIVE EXAMPLE 2

α-Alumina powder was obtained by hydrothermal process. Compressive strength of a particle in the powder was measured. The results obtained are shown in Table 8.

COMPARATIVE EXAMPLE 3

α-Alumina powder was obtained by hydrothermal process. Internal micro structure of a particle in the powder was observed with TEM. Many defects in the particle were detected. The result obtained is shown in Table 8.

COMPARATIVE EXAMPLES 4 TO 6

α-Alumina powders were obtained by electrofusion method. Internal micro structure of particle in the powder obtained in Comparative Example 4 was observed with TEM. Many defects in the particle were detected. Tapped density of each of the powders obtained in Comparative Examples 4, 5 and 6 was measured. The results obtained are shown in Table 8.

TABLE 1

| Example No. | Raw Material | Seed Crystal Kind | Amount (wt %) | Shape-Controlling Agent Kind | Amount (wt %) | Composition of Gas Atmosphere (vol %) | | | | | | | | | |
|---|---|---|---|---|---|---|---|---|---|---|---|---|---|---|---|
| | | | | | | HF | HCl | HBr | HI | F$_2$ | Cl$_2$ | Br$_2$ | I$_2$ | H$_2$O | N$_2$ | H$_2$ |
| 1 | tr-al A | α-al A | 3 | | | | 33 | | | | | | | | 17 | 50 |
| 2 | tr-al A | | | ZrO$_2$ | 1 | | 33 | | | | | | | | 17 | 50 |
| 3 | al-hy A | α-al A | 3 | | | | 33 | | | | | | | | 17 | 50 |
| 4 | tr-al A | α-al A | 3 | | | | | | | | 30 | | | 5 | 65 | |
| 5 | al-hy A | α-al A | 0.1 | | | 100 | | | | | | | | | | |
| 6 | al-hy A | α-al A | 0.1 | | | 30 | | | | | | | | | 70 | |
| 7 | al-hy A | α-al A | 0.1 | | | 20 | | | | | | | | | 80 | |

TABLE 1-continued

| Example No. | Raw Material | Seed Crystal Kind | Seed Crystal Amount (wt %) | Shape-Controlling Agent Kind | Shape-Controlling Agent Amount (wt %) | HF | HCl | HBr | HI | $F_2$ | $Cl_2$ | $Br_2$ | $I_2$ | $H_2O$ | $N_2$ | $H_2$ |
|---|---|---|---|---|---|---|---|---|---|---|---|---|---|---|---|---|
| 8 | al-hy A | α-al A | 0.1 | | | | 5 | | | | | | | | 95 | |
| 9 | al-hy A | α-al A | 0.1 | | | | 1 | | | | | | | | 99 | |
| 10 | al-hy A | α-al A | 0.1 | | | | 30 | | | | | | | | 70 | |
| 11 | al-hy A | α-al A | 0.1 | | | | 30 | | | | | | | | 70 | |
| 12 | al-hy A | α-al A | 0.1 | | | | 30 | | | | | | | | 70 | |
| 13 | tr-al A | α-al A | 0.1 | | | | 30 | | | | | | | | 70 | |
| 14 | tr-al B | α-al A | 0.1 | | | | 30 | | | | | | | | 70 | |
| 15 | al-hy B | α-al A | 0.1 | | | | 30 | | | | | | | | 70 | |
| 16 | al-hy C | α-al A | 0.1 | | | | 30 | | | | | | | | 70 | |
| 17 | alum | α-al A | 0.1 | | | | 30 | | | | | | | | 70 | |
| 18 | aluminum sulfate | α-al A | 0.1 | | | | 30 | | | | | | | | 70 | |
| 19 | al-hy A | α-al C | 0.02 | | | | 30 | | | | | | | | 70 | |
| 20 | al-hy A | α-al A | 3 | | | | 30 | | | | | | | | 70 | |
| 21 | al-hy A | α-al B | 3 | | | | 30 | | | | | | | | 70 | |
| 22 | al-hy A | α-al D | 0.1 | | | | 30 | | | | | | | | 70 | |
| 23 | al-hy A | $TiO_2$ | 0.1 | | | | 30 | | | | | | | | 70 | |

TABLE 2

| Example No. | Gas Feed Temperature (° C.) | Calcining Temperature (° C.) | Calcination Time (min) | Particle Diameter (μm) | D/H Ratio | Crystal Habit | Compressive Strength (Kg/mm²) | Tapped Density (g/cm³) |
|---|---|---|---|---|---|---|---|---|
| 1 | 800 | 1100 | 30 | 0.7 | 1 | F, H | | |
| 2 | 800 | 1100 | 30 | 13 | 1.7 | C | | |
| 3 | 800 | 1100 | 30 | | | | | |
| 4 | 800 | 1100 | 30 | | | | | |
| 5 | 800 | 1100 | 30 | 1.8 | 1 | F, H | | |
| 6 | 800 | 1100 | 30 | 1.9 | 1 | F, H | | 1.52 |
| 7 | 800 | 1100 | 120 | 1.9 | 1 | F, H | | |
| 8 | 800 | 1100 | 180 | 1.8 | 1 | F, H | | |
| 9 | 800 | 1100 | 600 | 1.9 | 1 | F, H | | |
| 10 | 20 | 600 | 180 | 1.9 | 1 | F, H | | |
| 11 | 20 | 800 | 600 | 1.9 | 1 | F, H | | |
| 12 | 20 | 1100 | 30 | 1.9 | 1 | F, H | | |
| 13 | 800 | 1100 | 30 | 1.8 | 1 | F, H | | |
| 14 | 800 | 1100 | 30 | 1.9 | 1 | F, H | | |
| 15 | 800 | 1100 | 30 | 1.9 | 1 | F, H | | |
| 16 | 800 | 1100 | 30 | 1.9 | 1 | F, H | | |
| 17 | 800 | 1100 | 30 | 1.9 | 1 | F, H | | |
| 18 | 800 | 1100 | 30 | 1.9 | 1 | F, H | | |
| 19 | 800 | 1100 | 30 | 0.6 | 1 | F, H | | 1.13 |
| 20 | 800 | 1100 | 30 | 0.7 | 1 | F, H | | |
| 21 | 800 | 1100 | 30 | 1.3 | 1 | F, H | | |
| 22 | 800 | 1100 | 30 | 10 | 1 | F, H | 570 | 2.24 |
| 23 | 800 | 1100 | 30 | 3.7 | 1 | F, H | | |

TABLE 3

| Example No. | Raw Material | Seed Crystal Kind | Seed Crystal Amount (wt %) | Shape-Controlling Agent Kind | Shape-Controlling Agent Amount (wt %) | HF | HCl | HBr | HI | $F_2$ | $Cl_2$ | $Br_2$ | $I_2$ | $H_2O$ | $N_2$ | $H_2$ |
|---|---|---|---|---|---|---|---|---|---|---|---|---|---|---|---|---|
| 24 | al-hy A | $TiO_2$ | 3 | | | | 30 | | | | | | | | 70 | |
| 25 | al-hy A | $Cr_2O_3$ | 3 | | | | 30 | | | | | | | | 70 | |
| 26 | al-hy A | $Fe_2O_3$ | 0.1 | | | | 30 | | | | | | | | 70 | |
| 27 | al-hy A | $Fe_2O_3$ | 3 | | | | 30 | | | | | | | | 70 | |

TABLE 3-continued

| Example No. | Raw Material | Seed Crystal Kind | Amount (wt %) | Shape-Controlling Agent Kind | Amount (wt %) | HF | HCl | HBr | HI | F$_2$ | Cl$_2$ | Br$_2$ | I$_2$ | H$_2$O | N$_2$ | H$_2$ |
|---|---|---|---|---|---|---|---|---|---|---|---|---|---|---|---|---|
| 29 | al-hy A | Ni$_2$O$_3$ | 3 | | | | 30 | | | | | | | | 70 | |
| 29 | al-hy A | V$_2$O$_5$ | 3 | | | | 30 | | | | | | | | 70 | |
| 30 | al-hy A | AlN | 1 | | | | 30 | | | | | | | | 70 | |
| 31 | al-hy A | α-al A | 0.1 | | | | | | | | 30 | | | 5 | 65 | |
| 32 | al-hy A | α-al A | 0.1 | MgO | 3 | | 30 | | | | | | | | 70 | |
| 33 | al-hy A | α-al A | 0.1 | B$_2$O$_3$ | 3 | | 30 | | | | | | | | 70 | |
| 34 | al-hy A | | | MgO | 0.1 | | 30 | | | | | | | | 70 | |
| 35 | al-hy A | | | NgO | 3 | | 30 | | | | | | | | 70 | |
| 36 | al-hy A | | | Mg(OH)$_2$ | 3 | | 30 | | | | | | | | 70 | |
| 37 | al-hy A | | | SiO$_2$ | 3 | | 30 | | | | | | | | 70 | |
| 38 | al-hy A | | | ZrO$_2$ | 3 | | 30 | | | | | | | | 70 | |
| 39 | al-hy A | | | CuO | 3 | | 30 | | | | | | | | 70 | |
| 40 | al-hy A | | | SrO | 3 | | 30 | | | | | | | | 70 | |
| 41 | al-hy A | | | ZnO | 3 | | 30 | | | | | | | | 70 | |
| 42 | al-hy A | | | MoO$_3$ | 3 | | 30 | | | | | | | | 70 | |
| 43 | al-hy A | | | Nb$_2$O$_5$ | 3 | | 30 | | | | | | | | 70 | |
| 44 | al-hy A | | | CaO | 1 | | 30 | | | | | | | | 70 | |
| 45 | al-hy A | | | B$_2$O$_3$ | 3 | | 30 | | | | | | | | 70 | |
| 46 | al-hy A | | | Y$_2$O$_3$ | 3 | | 30 | | | | | | | | 70 | |
| 47 | al-hy A | | | La$_2$O$_2$ | 3 | | 30 | | | | | | | | 70 | |

TABLE 4

| Example No. | Gas Feed Temperature (° C.) | Calcining Temperature (° C.) | Calcination Time (min) | Particle Diameter (μm) | D/H Ratio | Crystal Habit | Compressive Strength (Kg/mm$^2$) | Tapped Density (g/cm$^3$) |
|---|---|---|---|---|---|---|---|---|
| 24 | 800 | 1100 | 30 | 1 | 1 | F, H | | |
| 25 | 800 | 1100 | 30 | 1.9 | 1 | F, H | | |
| 26 | 800 | 1100 | 30 | 1.9 | 1 | F, H | 400 | |
| 27 | 800 | 1100 | 30 | 1.4 | 1 | F, H | | |
| 28 | 800 | 1100 | 30 | 1.4 | 1 | F, H | | |
| 29 | 880 | 1100 | 30 | 3.7 | 2 | F, H | | |
| 30 | 800 | 1100 | 30 | 6.3 | 1 | F, H | | |
| 31 | 800 | 1100 | 30 | 1.9 | 1 | F, H | | |
| 32 | 800 | 1100 | 30 | 1.8 | 1.5 | F | | |
| 33 | 800 | 1100 | 30 | 2 | 1 | B | | |
| 34 | 800 | 1100 | 30 | 14 | 2 | F | | |
| 35 | 800 | 1100 | 30 | 11 | 3 | F | | |
| 36 | 800 | 1100 | 30 | 14 | 1.5 | F | | |
| 37 | 800 | 1100 | 30 | 14 | 1.5 | F, A | | |
| 38 | 800 | 1100 | 30 | 14 | 1.5 | D | | |
| 39 | 800 | 1100 | 30 | 16 | 1.5 | F | | |
| 40 | 800 | 1100 | 30 | 15 | 1.5 | F | | |
| 41 | 800 | 1100 | 30 | 14 | 1.5 | F | | |
| 42 | 800 | 1100 | 30 | 11 | 1.2 | F | | |
| 43 | 808 | 1100 | 30 | 11 | 1.2 | F | | |
| 44 | 800 | 1100 | 30 | 18 | 1.5 | I | | |
| 45 | 800 | 1100 | 30 | 14 | 1 | B | | |
| 46 | 800 | 1100 | 30 | 15 | 1.2 | A | | |
| 47 | 800 | 1100 | 30 | 16 | 0.8 | D | | |

TABLE 5

| Example No. | Raw Material | Seed Crystal Kind | Amount (wt %) | Shape-Controlling Agent Kind | Amount (wt %) | HF | HCl | HBr | HI | F$_2$ | Cl$_2$ | Br$_2$ | I$_2$ | H$_2$O | N$_2$ | H$_2$ |
|---|---|---|---|---|---|---|---|---|---|---|---|---|---|---|---|---|
| 48 | al-hy A | | | CeO$_2$ | 3 | | 30 | | | | | | | | 70 | |
| 49 | al-hy A | | | Nd$_2$O$_3$ | 3 | | 30 | | | | | | | | 70 | |
| 50 | al-hy A | | | ZrO$_2$ | 3 | | 30 | | | | | | | | 70 | |
| 51 | al-hy A | | | MgO | 3 | | 30 | | | | | | | | 70 | |
| 52 | tr-al A | | | B$_2$O$_3$ | 3 | | 30 | | | | | | | | 70 | |
| 53 | al-hy A | | | MgO | 3 | | | | | | 30 | | | 5 | 65 | |

TABLE 5-continued

| Example No. | Seed Crystal Raw Material | Kind | Amount (wt %) | Shape-Controlling Agent Kind | Amount (wt %) | Composition of Gas Atmosphere (vol %) | | | | | | | | | | |
|---|---|---|---|---|---|---|---|---|---|---|---|---|---|---|---|---|
| | | | | | | HF | HCl | HBr | HI | $F_2$ | $Cl_2$ | $Br_2$ | $I_2$ | $H_2O$ | $N_2$ | $H_2$ |
| 54 | alum | | | MgO | 3 | | 30 | | | | | | | | 70 | |
| 55 | tr-al A | α-al A | 3 | | | | | | 33 | | | | | | 17 | 50 |
| 56 | tr-al A | | | $ZrO_2$ | 1 | | | | 33 | | | | | | 17 | 50 |
| 57 | al-hy A | α-al A | 3 | | | | | | 33 | | | | | | 17 | 50 |
| 58 | tr-al A | α-al A | 3 | | | | | | | | | | 30 | 5 | 65 | |
| 59- | tr-al A | α-al A | 3 | | | | | | | 33 | | | | | 17 | 50 |
| 60 | tr-al A | α-al B | 0.1 | $ZrO_2$ | 1 | | | | 33 | | | | | | 17 | 50 |
| 61 | al-hy A | α-al A | 3 | | | | | | 33 | | | | | | 17 | 50 |
| 62 | tr-al A | α-al A | 3 | | | | | | | | | | 30 | 5 | 65 | |
| 63 | tr-al A | α-al A | 3 | | | | | | | | 100 | | | | | |
| 64 | tr-al A | α-al A | 3 | | | | | | | | 5 | | | | 95 | |
| 65 | tr-al A | | | CaO | 1 | | | | | | 100 | | | | | |
| 66 | al-hy A | | | $B_2O_3$ | 0.1 | | 30 | | | | | | | | 70 | |
| 67 | al-hy A | | | $ZrO_2$ | 1 | | 30 | | | | | | | | 70 | |

TABLE 6

| Example No. | Gas Feed Temperature (° C.) | Calcining Temperature (° C.) | Calcination Time (min) | Particle Diameter (μm) | D/H Ratio | Crystal Habit |
|---|---|---|---|---|---|---|
| 46 | 800 | 1100 | 30 | 12 | 0.8 | D |
| 47 | 800 | 1100 | 30 | 13 | 0.8 | D |
| 48 | 400 | 1100 | 30 | 14 | 1.2 | B |
| 49 | 1100 | 1100 | 30 | 11 | 1.2 | C, H |
| 50 | 800 | 1100 | 30 | 14 | 1 | B |
| 51 | 800 | 1100 | 30 | | | |
| 52 | 800 | 1100 | 30 | | | |
| 53 | 800 | 1100 | 30 | 0.7 | 1 | F, H |
| 54 | 800 | 1100 | 30 | 15 | 0.7 | D |
| 55 | 800 | 1100 | 30 | | | |
| 56 | 800 | 1100 | 30 | | | |
| 57 | 800 | 1100 | 30 | 8.7 | 1 | F, H |
| 58 | 800 | 1100 | 30 | 3.8 | 0.6 | D |
| 59 | 800 | 1100 | 30 | | | |
| 60 | 800 | 1100 | 30 | | | |
| 61 | 20 | 1100 | 30 | 0.7 | 1 | F, H |
| 62 | 20 | 1280 | 30 | 0.7 | 1 | F, H |
| 63 | 1100 | 1280 | 30 | 4 | 3 | I |
| 64 | 800 | 1100 | 30 | 14 | 1.3 | B |
| 65 | 800 | 1100 | 30 | 18 | 0.8 | D |

TABLE 7

| Example No. | Seed Crystal Raw Material | Kind | Amount (wt %) | Shape-Controlling Agent Kind | Amount (wt %) | Composition of Gas Atmosphere (vol %) | | | | | | | | | | |
|---|---|---|---|---|---|---|---|---|---|---|---|---|---|---|---|---|
| | | | | | | HF | HCl | HBr | HI | $F_2$ | $Cl_2$ | $Br_2$ | $I_2$ | $H_2O$ | $N_2$ | $H_2$ |
| Comparative Example 1 | al-hy A | | | | | calcined in air | | | | | | | | | | |
| Comparative Example 2 | | | | | | (Hydrothermal process) | | | | | | | | | | |
| Comparative Example 3 | | | | | | (Hydrothermal process) | | | | | | | | | | |
| Compara- | | | | | | (Electrofusion method) | | | | | | | | | | |

TABLE 7-continued

| Example No. | Raw Material | Seed Crystal Kind | Seed Crystal Amount (wt %) | Shape-Controlling Agent Kind | Shape-Controlling Agent Amount (wt %) | HF | HCl | HBr | HI | $F_2$ | $Cl_2$ | $Br_2$ | $I_2$ | $H_2O$ | $N_2$ | $H_2$ |
|---|---|---|---|---|---|---|---|---|---|---|---|---|---|---|---|---|
| tive Example 4 | | | | | | | | | | | | | | | | |
| Comparative Example 5 | | | | | | (Electrofusion method) | | | | | | | | | | |

TABLE 8

| Example No. | Gas Feed Temperature (° C.) | Calcining Temperature (° C.) | Calcination Time (min) | Particle Diameter (μm) | D/H Ratio | Crystal Habit | Compressive Strength (Kg/mm$^2$) | Tapped Density (g/cm$^3$) |
|---|---|---|---|---|---|---|---|---|
| Comparative Example 1 | | | | 0.7 | non-uniform | | | |
| Comparative Example 2 | | | | 10 | | | 13 | |
| Comparative Example 3 | | | | 2 | | | | |
| Comparative Example 4 | | | | 2 | | | | 1.30 |
| Comparative Example 5 | | | | 0.6 | | | | 0.80 |
| Comparative Example 6 | | | | 8 | | | | 1.50 |

Note:
*Based on the amount of alumina obtained from the raw material.

The α-alumina powder of the present invention produced by the process according to the present invention comprises α-alumina particles having a substantially octahedral or eicosahedral shape, a specific structure, and a narrow primary particle size distribution, and therefore has excellent characteristics and is particularly useful as a raw material for abrasives, fillers, sinters or spacers.

While the invention has been described in detail and with reference to specific examples thereof, it will be apparent to one skilled in the art that various changes and modifications can be made therein without departing from the spirit and scope thereof.

What is claimed is:

1. A process for producing α-alumina powder comprising the step of calcining under atmospheric pressure at least one of transition alumina or a transition alumina precursor capable of being converted to transition alumina on heating, in a gas atmosphere containing a hydrogen halide selected from the group consisting of hydrogen chloride, hydrogen bromide and hydrogen iodide, in the presence of a seed crystal to obtain α-alumina powder comprising α-alumina particles having a substantially octahedral or eicosahedral shape and having a D/H ratio of from 1 to 2 wherein D represents a maximum particle diameter parallel to a hexagonal lattice plane of a hexagonal close-packed lattice of α-alumina and H represents a maximum particle diameter perpendicular to the hexagonal lattice plane; wherein said seed crystal is a crystal serving as a nucleus for crystal growth around the seed crystal, and a crystal of α-alumina grows around the seed crystal and wherein said seed crystal is at least one compound selected from the group consisting of α-alumina, an oxide of titanium, vanadium, chromium, iron and nickel and a nitride of titanium, vanadium, chromium, iron and nickel.

2. A process as claimed in claim 1, wherein said calcining is at a temperature of from 500° to 1400° C.

3. A process as claimed in claim 1, wherein said transition alumina precursor is aluminum hydroxide, alum or aluminum sulfate.

4. A process as claimed in claim 1, wherein said gas atmosphere has a hydrogen chloride concentration of from 0.1% to 30% by volume based on said gas atmosphere, a hydrogen bromide concentration of from 0.1% to 33% by volume based on said gas atmosphere, or a hydrogen iodide concentration of from 0.1% to 33% by volume based on said gas atmosphere.

5. A process as claimed in claim 1, wherein said gas atmosphere has a hydrogen chloride concentration of from 0.5% to 30% by volume based on said gas atmosphere, a hydrogen bromide concentration of from 0.5% to 33% by volume based on said gas atmosphere, or a hydrogen iodide concentration of from 0.5% to 33% by volume based on said gas atmosphere.

6. A process as claimed in claim 1, wherein said gas atmosphere has a hydrogen chloride concentration of from 1.0% to 30% by volume based on said gas atmosphere, a hydrogen bromide concentration of from 1.0% to 33% by volume based on said gas atmosphere, or a hydrogen iodide concentration of from 1.0% to 33% by volume based on said gas atmosphere.

7. A process as claimed in claim 1, wherein said calcining is conducted at a temperature of from 600° C. to 1,300° C.

8. A process as claimed in claim 1, wherein said calcining is conducted at a temperature of from 700° C. to 1,200° C.

9. A process as claimed in claim 1, wherein said calcining is conducted for at least 1 minute.

10. A process as claimed in claim 1, wherein said calcining is conducted for 10 minutes.

11. A process as claimed in claim 1, wherein said calcining is conducted for 10 to 600 minutes.

* * * * *